United States Patent [19]

Johansson

[11] Patent Number: 4,537,343
[45] Date of Patent: Aug. 27, 1985

[54] TOOL FOR FASTENING AN ELONGATED OBJECT ON A SUPPORTING SURFACE

[76] Inventor: Curt R. Johansson, Lagm.v.53, S-186 00 Vallentuna, Sweden

[21] Appl. No.: 551,986

[22] PCT Filed: Mar. 28, 1983

[86] PCT No.: PCT/SE83/00111
§ 371 Date: Nov. 7, 1983
§ 102(e) Date: Nov. 7, 1983

[87] PCT Pub. No.: WO83/03721
PCT Pub. Date: Oct. 27, 1983

[30] Foreign Application Priority Data
Apr. 5, 1982 [SE] Sweden ................. 8202171

[51] Int. Cl.³ .................... B25C 5/11; B25C 7/00
[52] U.S. Cl. ........................... 227/120; 227/147; 227/156
[58] Field of Search .......... 227/31, 107, 119, 120, 227/147, 156

[56] References Cited

U.S. PATENT DOCUMENTS

| | | | |
|---|---|---|---|
| 2,637,030 | 5/1953 | Wickman et al. | 227/120 |
| 3,119,115 | 1/1964 | Bello | 227/31 |
| 3,391,842 | 7/1968 | Mathes | 227/147 |
| 3,883,064 | 5/1975 | Hilgers | 227/120 |
| 4,087,035 | 5/1978 | Harmon | 227/120 |
| 4,225,075 | 9/1980 | Chi | 227/119 |
| 4,424,929 | 1/1984 | Weis | 227/120 X |

FOREIGN PATENT DOCUMENTS

| | | | |
|---|---|---|---|
| 202278 | 2/1956 | Australia | 227/107 |
| 2035601 | 12/1970 | France . | |
| 120277 | 9/1970 | Norway . | |
| 134134 | 10/1974 | Norway . | |
| 7203425-9 | 3/1972 | Sweden . | |
| 7216771-1 | 12/1972 | Sweden . | |
| 601929 | 12/1977 | Switzerland . | |
| 1377808 | 12/1974 | United Kingdom | 227/120 |
| 1554602 | 10/1979 | United Kingdom . | |

*Primary Examiner*—Paul A. Bell
*Attorney, Agent, or Firm*—Barnes, Kisselle, Raisch, Choate, Whittemore & Hulbert

[57] ABSTRACT

The tool for fastening an elongated object (41) is of the tacker type and has a magazine (11). The magazine is designed for cooperation with a strip of U-shaped clips (17), each of which has its U-legs located one after the other, as counted in the longitudinal direction of the magazine. The clips are fed one by one up to a mounting station at the front end of the tool. At this station they are arrested by an abutment member (9, 37) in a well-defined, freely projecting position for mounting over the elongated object oriented transversely of the longitudinal direction of the magazine, by driving the fastening member (19) of the clips into the supporting surface with the aid of the driving element (3) of the tool. When driving the fastening element into the surface, the clip (17') located at the mounting station will be separated from the immediately succeeding clip (17).

10 Claims, 3 Drawing Figures

TOOL FOR FASTENING AN ELONGATED OBJECT ON A SUPPORTING SURFACE

The present invention relates to a tool for fastening an elongated object on a wall or other supporting surface by means of U-shaped clips, in particular for fastening electric wires, telephone wiring, cables, hoses or the like.

Examples of such tools are shown and described in U.S. Pat. Nos. 2,637,030 and 4,087,035, GB-A-1,554,602 and FR-Al-2,035,601. The two first-mentioned patent specifications disclose tools where the elongated object is secured to the supporting surface by means of U-shaped staples the two legs of which are driven into the surface in the same way as conventional staples. The latter two patent specifications disclose tools where the U-shaped staples cooperate with U-shaped clips, for instance of plastic, in order to provide a broader surface of engagement. A feature common to all these four prior art tools is that the successive staples of the strip of staples employed are interconnected in a juxtaposed relation, such that the two legs of a staple are connected to the corresponding legs of adjacent staples. This means that the tool must be held along the elongated object when the staples are driven into the supporting surface.

GB-A-1,377,808 discloses another tool for fastening elongated objects on a surface. In this tool, use is made of a strip of U-shaped clips in which one leg of the U is designed as a fixing part cooperating with a special fastening member in the form of a nail which is driven through a hole provided in advance in said fixing part. This tool uses separate nail and clip magazines, of which at least the clip magazine is oriented in the longitudinal direction of the tool, such that the longitudinal direction of the tool, when in use, must be parallel to the elongated object. This prior art tool, therefore, suffers from the same drawback as the prior art tools mentioned above.

It is true that these known tools for mounting clips about electric wires, telephone wiring, cables, hoses etc. imply a substantial improvement in relation to the manual mounting of separate clips one by one. However, the prior art tools suffer from many drawbacks linked with the necessity of orienting the tool along the elongated object to be fastened on the supporting surface. One drawback in this context is that it will be difficult to use the tool in the immediate proximity of a wall, since the hand holding the tool will be a hindrance. Also, the width of the tool limits the possibility of getting close to a wall. Moreover, the four first-mentioned tools must permit applying the legs of the staples on either side of the elongated object. The prior art tools, at least the four first-mentioned ones, further require a close conformity between the shape of the staples and the shape of the wire, with an ensuing lack of flexibility. An additional shortcoming is that it may be difficult, because of the orientation of the staples or clips, to see exactly where the legs of the staples or clips are placed with respect to the elongated object, which entails a risk that the fastening member may be driven through the elongated object.

An object of the present invention, therefore, is to provide an improved tool which makes it much easier to operate quite close to a wall. Another object is to provide a tool which reduces the risks of driving the fastening member through the elongated object. A still further object of the invention is to provide a tool which makes it possible readily to adapt the tool to different clip dimensions. Yet another object of the invention is to provide a tool in which accurate guiding of the driving element of the tool, with respect to the fastening member of the clips, can be obtained in a simple way.

The present invention thus relates to a tool for fastening an elongated object on a wall or other supporting surface by means of U-shaped clips which are intended to embrace the elongated object and, by means of a fastening member passing through one leg of the clip, to be secured to the supporting surface, said tool comprising a magazine for housing a strip of clips in the form of a continuous succession of mutually detachable clips, a feed device which is adapted to feed the strip of clips in a direction towards a mounting station determined by an abutment member at the front end of the tool, and a driving device with a driving element for driving the fastening member of a clip located at the mounting station into the supporting surface.

According to the invention, the tool is characterised in that the magazine is designed to accommodate a strip of clips, of which each individual clip carries its fastening member and has its U-legs placed after each other, as counted in the longitudinal direction of the magazine, to be secured over the elongated object oriented transversely of the longitudinal direction of the magazine, and that the abutment member is adapted to arrest the foremost clip of the strip of clips in a substantially freely protruding position at the mounting station and to align the fastening member of this clip with respect to said driving element.

Admittedly, use has previously been made of strips of metal clips, in which the individual clips are arranged in the transverse direction with respect to the strip of clips, but these prior art strips of clips have been used in order to join two elongated objects to each other by forming the clips into a loop around the elongated objects (SE-A-382,246). In this prior art device, there is thus no fastening of the elongated objects to a supporting surface but merely a joining of two elongated objects by causing the clips to form loops.

The tool according to the invention thus is intended to cooperate with a strip of clips where the individual clips are interconnected by means of connections, such that the clips, when the tool is in use, will successively be separated one by one from the front end of the strip of clips in that these connections are caused to break or are cut off. The U-shaped part of the clips is preferably made of an electrically insulating material, such as plastic. The fastening member may be a nail, tack or the like.

Since the abutment member is adapted to arrest the foremost clip of the strip in a position outside the magazine proper and in a substantially freely projecting position at the mounting station, it will be much easier to secure the elongated objects very close to for instance a wall. Moreover, if the abutment member is then arranged so as to project forwards from the body portion of the tool, the clip located at the mounting station will be practically entirely visible, this making it easier accurately to position the clip correctly with respect to the elongated object. Also, this reduces the risk that the fastening member of the clip will be driven through the object to be fastened. The mounting station is thus advantageously provided in direct conjunction with the forward corner of the tool, i.e. the corner between the base (normally the magazine) of the tool and the front of the tool. The surfaces of these parts or sides are preferably perpendicular to each other. At the mounting station, the clip is advantageously retained only by its connection to the succeeding clip in the strip located in the magazine.

It is important that the clip located at the mounting station is correctly positioned with respect to the drying element of the tool, this being achieved in that the abutment member is given such a shape and location with respect to the clips in the strip, that a correct alignment is attained. In order accurately to guide the clip to this correct position, the abutment member may advantageously have a surface portion which is conformed to the outer surface of the clip. Further, the abutment member may also advantageously have a channel or groove facing the magazine and directed in the direction of movement of the driving element, for cooperation with the fastening member of the clip and centering of the fastening member at the mounting station. Such a channel or groove may also serve as guide means for the driving element.

Hence, by using said abutment member, one will attain an accurate aligment of the fastening member of the clip with respect to the driving element of the tool, this reducing the risk that the fastening member will be bent instead of driven into the supporting surface. The abutment member may thus cooperate with suitable parts of the clip and/or its fastening member.

The presence of the abutment member means that the clip located at the mounting station, when applied over or pressed on to the elongated object, will be urged into the correct position, even if the tool is held obliquely in relation to the elongated object during the initial phase of the application of the clip over the elongated object. One will thus have a positive pivotment or turning of the clip and/or the tool, and the use of a guide channel for the fastening member will safeguard an always correct alignment thereof with respect to the driving element of the tool.

As mentioned above, the abutment member may be replaceable to allow adaptation of the tool to different clip dimensions. Another option is however to make the abutment member adjustable, such that the tool can be readily adjusted to different clip dimensions which generally can be easily stored in and fed by means of one and the same magazine.

If an improvement of the lateral stability is desired in addition to that obtained with the above-mentioned channel in the abutment member, it is possible to supplement the abutment member with lateral abutment means, for instance in the form of a flange which extends downwards on either side of the clip. Such lateral abutments may diverge downwardly and/or rearwardly, whereby it will be easier to guide the clip to the right position at the mounting station.

If the tool is to be used under such conditions that there is a risk, when applying the clip located at the mounting station over an elongated object, that the clip may be subjected to a substantial tendency to pivot rearwards (which would make it more difficult to ensure the aligning effect of the abutment member), it is possible to provide behind the clip a special abutment means serving as a support behind the fastening member extending over the clip. Such an abutment means may be made pivotal, such that the fastening member of the clip, when it is advanced to the mounting station, will turn away the abutment means which, once the fastening member has passed, will swing back and occupy a position behind the fastening member, so that the driving element of the tool will be able to pass freely in conjunction with the stroke movement.

In order to make it easier to detach the clip located at the mounting station when the fastening member is driven into the supporting surface, the bottom of the magazine may have a transverse edge portion which supports the leading leg of the U of the clip which is situated immediately inwardly of the mounting station. This edge portion will then serve as a support for shearing off the clip located at the mounting station. Alternatively, the edge surface may serve as an anvil for a separate puch or knife element for positively cutting off the connection between consecutive clips.

Also, in order to make it easier to detach the clip located at the mounting station by shearing, it is possible to cause this clip at the mounting station to occupy a position in which the fixing part (i.e. the leg through which the fastening member extends) of the clip has its underside spaced a certain distance from the surface, while the succeeding clip rests on the bottom of the magazine and is maintained thereby at a corresponding height over the supporting surface. When the clip located at the mounting station is then pressed into engagement with the surface when the fastening member is driven into it, one will obtain the desired relative movement in order to bring about the intended separation or shearing-off. If the separtion is obtained by means of a special cutting means, this may suitably be connected to the driving element of the tool so as to move along with it. The knife or punch means may then cooperate with the front edge of the magazine bottom, and the downward stroke can be arrested before the knife means reaches below the bottom of the magazine. By such an arrangement, the knife means will not advance too far in a dangerous manner when the driving element of the tool performs its stroke.

If the clip located at the mounting station is on a higher vertical level than the supporting surface, the fastening members of the clips may project from the underside of the clips, suitably a distance which slightly exceeds the distance between the surface and the free end of the fixing part of the clip. This makes possible a correct positioning of the point of the fastening member, such that it can be placed at the desired location of the surface, for instance in connection with the positioning of the clip with respect to a wall dowel previously mounted in the surface. The projecting point of the fastening member can thus serve as a centering tip.

The measure of letting the clip located at the mounting station be in a "raised" position with respect to the supporting surface, may in many instances facilitate the initial application of the clip over the elongated object, since the clip need not be completely pressed down over the object during the application. If the free flexible part of the clip must be stretched apart or urged resiliently upwards to a relatively great extent around a relatively thick elongated object, this may be a substantial advantage, since a spring action will thus also add to the fastening effect.

The magazine for the strip of clips may advantageously consist of a U-shaped channel body on whose smooth bottom the clips rest and are fed. If the points of the fastening members of the clips project downwards, the bottom is suitably designed with a longitudinal groove in which the points are accommodated and which will produce a guiding effect. In order to enhance the guiding effect, the magazine may also be provided with flanges which project inwardly from the side walls of the magazine so as to define between them a guide slot for the portion of the fastening member which projects above the fixing parts of the clips. A guide arrangement of this type means that the adjustment between the width of the clips and the inner width of the magazine is not very critical, i.e. it is possible to use different clip widths in one and the same magazine. Also, the clip height, like the length of the fastening members, may vary within reasonable limits. If so desired, it is however possible to provide the magazine with internal guide means of the leaf spring type or the like, which assist in centering the strip of clips and in holding it urged against the bottom of the magazine.

In order to feed the strip of clips towards the mounting station, it is possible to use different feed devices, ranging from simple tension spring mechanisms which are manually tensionable and disposed in the magazine, to more sophisticated intermittent feed mechanisms driven by the drive mechanism of the tool. These various mechanisms may have drivers cooperating with the clips or their fastening members. Of importance is merely that the foremost clip in the strip of clips is urged forwards to the required extent so as to be able to occupy the correct position at the mounting station, and that the feed mechanism itself serves as a stop preventing the strip of clips from leaving the magazine in the rearward direction. Alternatively, the magazine may be supplemented with such a stop. Besides, the magazine is preferably so designed that the clips are inserted in the magazine at the rear end thereof, the feed mechanism being movable into engagement with the strip of clips just inserted. The strip of clips which is used in the tool according to the invention may, as mentioned above, preferably consist of an electrically insulating material, preferably a plastic material. The different U-shaped clips may be interconnected by means of a suitable linkage or connection, for instance a bridge or a glue joint or fuse link between successive U-legs. The position of the links or the number of links between successive clips is not critical, but it must be ensured that the clips can be separated from each other when the fastening member of the clip located at the mounting station is driven into the supporting surface.

The components of the tool for driving the driving element may be of a conventional design and may be driven for instance by compressed air, springs, electromechanical or hydraulic means. These tool components may thus advantageously be of a construction which is customary in nailing tools or staple tackers.

An example of a tool according to the invention will be described in greater detail hereinbelow with reference to the accompanying drawings.

Figure 1:
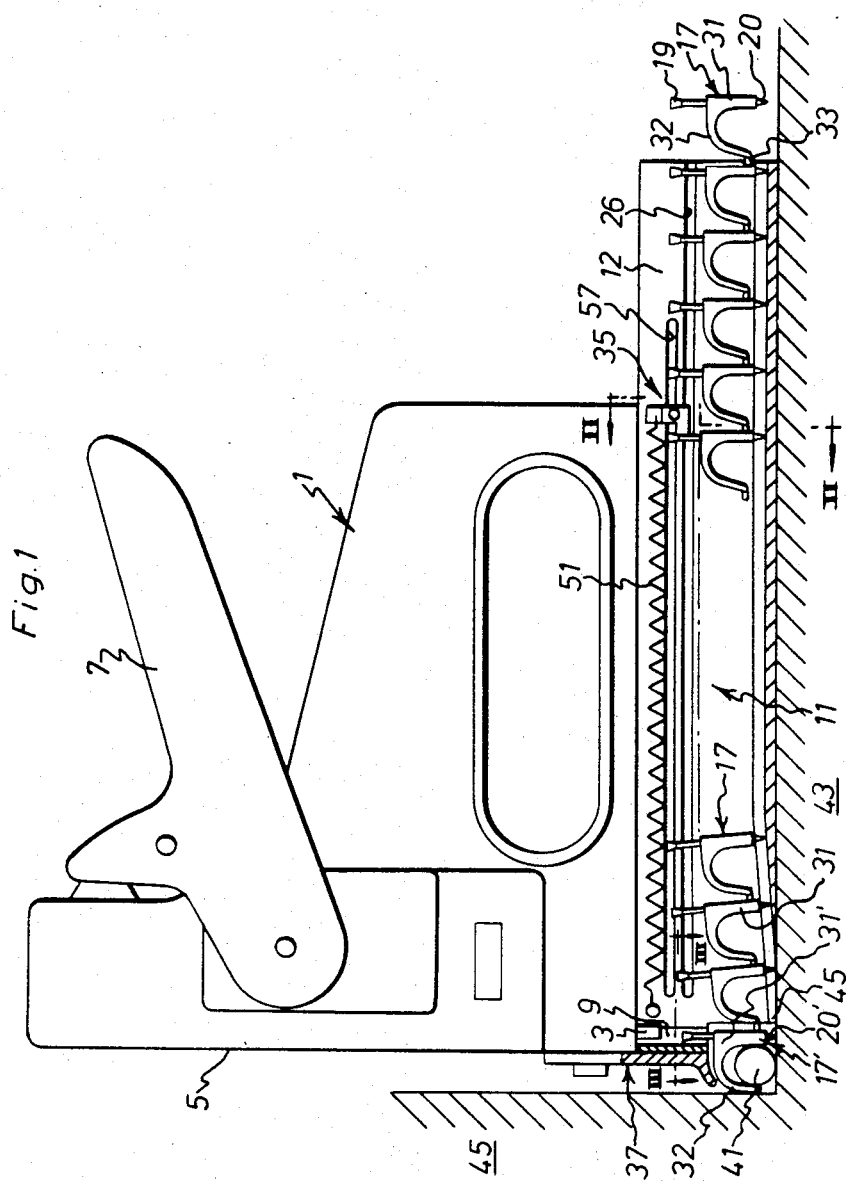
FIG. 1 is a partial section and side view of an example of a tool according to the invention.

The tool illustrated in the drawings is in principle designed as a conventional staple tacker but has a modified magazine and modified driving and guiding means. The handle and body portion 1 of the tool, including the drive mechanism for the driving element 3 of the tool, is entirely conventional and may for instance be of the basic type disclosed in U.S. Pat. No. 2,137,642 to which reference is now made. A more detailed description of these tool components would therefore seem superfluous.

The driving element 3 of the tool is adapted to move along a path adjacent the front face 5 of the tool and is modified as compared with the driving element of a conventional staple tacker, which rather resembles a blade. In the illustrated embodiment, the driving element is cylindrical and has a diameter which is slightly greater than the diameter of the nails 19 to be driven into the supporting surface. The underside of the driving element 3 may suitably be slightly concave. The mechanism of the tool is such that the driving element will remain stationary in the illustrated retracted resting position until the drive mechanism is triggered (in the illustrated instance, by pressing the handle 7). When the drive mechanism is triggered, the driving element 3 will be forced downwards in a stroke movement which can be brought about by means of a tensioned spring or in any other suitable way.

The tool magazine 11 for the strip of clips forms the base of the tool and is extended rearwards with respect to the body portion 1 of the tool. The magazine consists of a substantially U-shaped channel member 13 which is fixed to the underside 14 of the body portion 1 in a suitable way (not shown in greater detail). The magazine may be of such a design that it can be readily replaced for adapting the tool to different clip dimensions. Along the smooth bottom 15 of the magazine, a strip of interconnected clips 17 is fed. The strip of clips is inserted through the open rear end of the magazine, this end having conveniently bevelled edges to facilitate the introduction of the strip of clips and to prevent any interference in the feed of the strip of clips because parts of the strip located outside the magazine would catch the rear opening of the magazine. In order to improve the alignment and the stability of the tool when, in its working position, the tool has its external bottom surface placed against for instance a wall, the rear part of the magazine may be provided with laterally projecting support means whose supporting surfaces are flush with the bottom surface of the magazine and which preferably can be readily swung up against the side walls of the magazine.

In the illustrated embodiment, the nail 19 of each clip protrudes underneath the clip and so the bottom 15 of the magazine has a groove 21 for accommodating the point 20 of the nails. Thus, these points will be guided. A guide slot 23 for guiding the upwardly projecting parts of the nails is defined by two longitudinal flanges 25, 26 projecting inwards from the inner side walls of the magazine.

In the illustrated embodiment, each clip is of uniform width, but it might have a wider fixing part and a tapering front part. As appears from FIG. 1, the clips are substantially U-shaped and have one leg designed as a fixing part 31 through which the clip nails 19 extend. The rest of the clip, i.e. the web and the other leg of the clip form a flexible part 32.

The downwardly bent part 32 has a downwardly decreasing thickness and its lower portion in the embodiment illustrated in FIG. 1, extends substantially in parallel with the fixing part 31 and terminates approximately on a level with the underside of the fixing part. The clips, which in this instance are made of a plastic material, are interconnected by means of a thin narrow bridge 33 which at a central location connects the lower end of a clip part 32 to the lower end of the part 31 of a preceding clip. It should be noted that instead of a single bridge 33, it is possible to use for instance one bridge at either side. Similarly, the bridge or bridges may be located otherwise and may be so designed that they can be easily separated or short apart from the clip parts associated therewith.

For feeding the clips 17 through and out of the magazine 11, there is a feed device 35 which will be described in more detail hereinbelow. The feed device advances the foremost clip 17' to a free position at a mounting station adjacent the corner of the tool between the bottom and the front face 5. In the illustrated embodiment, the thickness of the magazine bottom decreases over the last stretch up to the mounting station, the bottom of the groove 21 following this bevel so as to form a downwardly open slot in the outer portion of the magazine bottom. Thus, the nail point 20' of the clip 17' fed to the mounting station will leave the groove 21 substantially flush with or slightly projecting underneath the bottom plane of the magazine or the tool. However, the curved part 32 of the immediately succeeding clip remains inside the magazine just at the discharge opening thereof which is defined by the terminal edge portion 45 of the magazine bottom 15. The nail 19' of the clip 17' located at the mounting station is advanced by the feed device 35 into engagement with a channel-shaped element 9 which serves as guide means for the driving element 3 of the tool but which also serves as a guide for centering the nail 19' of the clip at the mounting station with respect to the driving element 3. The channel-shaped element or guide means 9 may be a separate member or form part of a forwardly projecting foot-like abutment member 37. In the illustrated embodiment, this abutment member cooperates with the upper side of the leading part 32' of the clip as seen in the direction of feed and has an abutment surface which substantially mates with the contour of the outer surface of the part 32'. The abutment member 37 is mounted on the front wall 5 in such a manner that it can easily be removed and/or displaced to allow replacement or adaptation to a particular type of clip. For the same purpose, the guide means 9 whose underside may serve as an abutment for the upper face of the fixing part 31' may be connected to the abutment member 37.

In the position of mounting as shown in FIG. 1 in which the clip 17' is applied over a cable 41 in the corner between two walls 43, 45, the clip has thus been urged against the cooperating abutment surfaces 9 and 37 and, hence, will be maintained in a correct position of orientation in order that the nail 19' should be located in the path of movement of the driving element 3. The clip 17' is at a certain distance from the surface (i.e. the wall 43) which substantially corresponds to the distance the point 20' of the nail projects. The nail point 20' engages the wall 43 and thus assists in urging the clip against the abutment surfaces 9 and 37. When the nail 19' is driven into the supporting surface, the clip 17' will also be pressed against the wall 43 and around the cable 41, the connection 33 to the following clip 17 being at the same time shorn off. In that the bent part 32 of the succeeding clip 17 rests on the edge portion 45 of the magazine bottom, the clip 17' located at the mounting station will be shorn loose in a very reliable and effective manner. With the illustrated construction of the tool the operator may very well have the driving element 3 perform more than one stroke against each nail 19, if so required, for instance because of a particularly hard surface.

Figure 2:
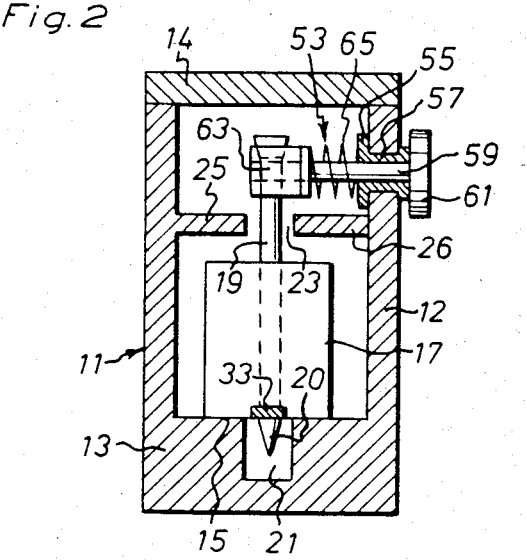
FIG. 2 is a section taken along the line II—II in FIG. 1.

The feed device 35 previously mentioned is partly shown in greater detail in FIG. 2 and comprises a tension spring 51 actuating a driver 53. This driver is intended to engage the back of a nail 19 of a clip 17 and pull the strip of clips forward. One end of the tension spring is fixed at the forward end portion of the magazine while its other end is connected to a sleeve member 55 of the driver. The sleeve member is displaceable in a slot 57 extending along the major portion of one side wall 12 of the magazine 11. The sleeve member carries a transversely directed pin 59 movable through the sleeve member. At the outer side of the wall 12, the pin 59 is provided with a handle 61 while on the end located inside the magazine, it is provided with a driver 63 for engaging a preceding nail 19. Between the driver 63 and the sleeve 55 there is mounted a compression spring 65 on the pin 59. If the operator, by means of the handle 61, pulls the pin 59 outwards against the action of the spring 65, he can remove the driver 63 from the path of the nails and tension the feed device by pulling the driver 53 rearwards along the slot 57, whereupon the driver 63 is allowed to return behind a nail of a clip located in the rear portion of the magazine.

Figure 3:
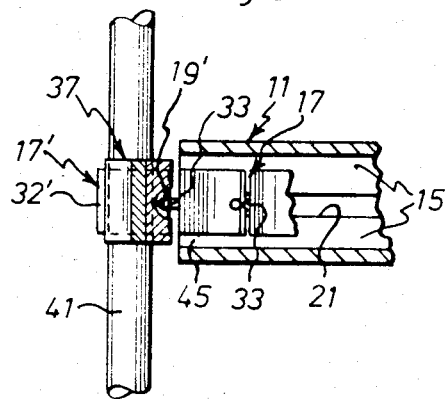
FIG. 3 is a section taken along the line III—III in FIG. 1.

As appears from FIG. 3, it is easy to correctly position the tool with respect to the elongaged object, for instance a wire 41, to be fastened by means of the clips 17. Since the abutment member 37 projects from the front face of the tool, it is possible to use the tool even if the elongated object is located adjacent a corner. Moreover, by this location of the abutment member, it is easier to ensure that the nail 19 is not driven through the wire or object to be fastened.

I claim:

1. A tool for fastening an elongated object (41) on a wall or other supporting surface (43) by means of U-shaped clips (17) which are intended to embrace the elongated object and, by means of a fastening member (19) passing through one leg (31) of the clip, to be secured to the supporting surface, said tool comprising a magazine (11) for housing a strip of clips in the form of a continuous succession of mutually detachable clips (17), a feed device (35) which is adapted to feed the strip of clips in a direction towards a mounting station determined by an abutment member (9, 37) at the front end of the tool, and a driving device with a driving element (3) for driving the fastening member (19') of a clip (17') located at the mounting station into the supporting surface (43), characterized in that the magazine (11) has means for guiding a strip (17) of mutually detachable clips in a manner such that each individual clip carrying its fastening member (19) is oriented with its U-legs disposed one after the other in the plane of movement of the clips to be secured over the elongated object (41) oriented transversely of the longitudinal direction of the magazine, and that the abutment member (9, 37) is adapted to arrest the foremost clip (17') of the strip of clips in a substantially freely protruding position at the mounting station with the plane of the foremost clip transverse of the elongated object and to align the fastening member (19') of this clip with respect to said driving element (3).

2. Tool as claimed in claim 1, characterized in that the bottom (15) of the magazine (11) has a transverse edge portion (45) for supporting the U-legs of the clip (17) located immediately inwardly of the mounting station.

3. Tool as claimed in claim 1, characterized in that the abutment member (9, 37) has a surface portion conformed to the outer surface of the clip (17).

4. Tool as claimed in claim 1, characterised in that the abutment member (9, 37) has a channel (9) facing the magazine and oriented in the direction of movement of the driving element (3), for centering the fastening member (19') of the clip (17') at the mounting station.

5. Tool as claimed in claim 4, characterised in that the channel (9) of the abutment member (9, 37) serves as guide means for the driving element (3).

6. Tool as claimed in any one of claims 1–5, characterised in that the bottom (15) of the magazine has a longitudinal groove (21) for receiving a tip portion (20) of the fastening member (19), which projects from the clips (17).

7. Tool as claimed in any one of claims 1–5, characterised in that the abutment member (9, 37) and, the magazine (11), are interchangeably mounted on the tool to allow adaptation thereof to different clip dimensions.

8. Tool as claimed in any one of claims 1–5, characterised in that the magazine (11), the abutment member (9, 37), and the driving element (3) are designed for cooperation with a strip of clips, in which the fastening members (19) extend through the rear leg (31) of the clip (17) as seen in the direction of feed.

9. Tool as claimed in any one of claims 1–5, characterised in that the abutment member (9, 37) projects forwardly from the body portion (1) of the tool.

10. Tool as claimed in any one of claims 1–5, characterised in that the magazine (11) has inwardly projecting flanges (25, 26), spaced from the bottom (15) of the magazine, for defining a guide slot for the parts of the fastening members (19) of the clips that extend above the clips (17).

* * * * *